United States Patent

Pokorny

[11] Patent Number: 5,667,858
[45] Date of Patent: Sep. 16, 1997

[54] PRESSURE SENSITIVE ADHESIVE COMPOSITION AND PRODUCTS

[75] Inventor: Richard J. Pokorny, Maplewood, Minn.

[73] Assignee: Minnesota Mining and Manufacturing Company, St. Paul, Minn.

[21] Appl. No.: 617,946

[22] Filed: Mar. 15, 1996

Related U.S. Application Data

[63] Continuation of Ser. No. 183,056, Jan. 18, 1994, abandoned.
[51] Int. Cl.⁶ .................................. C09J 7/02; C09J 11/06
[52] U.S. Cl. ................ 428/41.8; 428/343; 428/354; 428/355 AK; 525/331.8; 525/350
[58] Field of Search .................... 428/343, 354, 428/355, 41.8; 525/331.8, 350

[56] References Cited

U.S. PATENT DOCUMENTS

| | | | |
|---|---|---|---|
| 2,328,066 | 8/1943 | Drew | 117/80 |
| 2,708,192 | 5/1955 | Joesting et al. | 117/122 |
| 2,881,096 | 4/1959 | Kisbany | 117/122 |
| 2,963,387 | 12/1960 | Herr et al. | 117/122 |
| 2,987,420 | 6/1961 | Bemmels et al. | 117/122 |
| 3,231,419 | 1/1966 | Korpman | 117/122 |
| 3,242,110 | 3/1966 | Korpman | 260/5 |
| 3,535,152 | 10/1970 | Korpman | 117/122 |
| 3,862,274 | 1/1975 | Moberly | 525/261 |
| 3,912,676 | 10/1975 | Brizzolara | 524/459 |
| 3,932,355 | 1/1976 | Barney | 525/209 |

FOREIGN PATENT DOCUMENTS

| | | |
|---|---|---|
| 0 197 774 | 10/1986 | European Pat. Off. . |
| 953 239 | 5/1949 | France . |
| 1 516 706 | 2/1968 | France . |
| 2-206671 | 8/1990 | Japan . |
| 4-173888 | 6/1992 | Japan . |
| 39 514 | 12/1960 | Luxembourg . |
| 975971 | 11/1964 | United Kingdom . |

*Primary Examiner*—Jenna Davis
*Attorney, Agent, or Firm*—Gary L. Griswold; Walter N. Kirn

[57] ABSTRACT

A pressure sensitive adhesive composition is provided having about 100 parts by weight of a crosslinkable elastomer, from 20–100 parts by weight of a tackifying resin, at least 0.1 part by weight of a higher aliphatic mercaptan, up to 30 parts by weight of a heat curable phenolic resin, and up to about 10 parts by weight of a catalyst for the phenolic resin.

27 Claims, 1 Drawing Sheet

PRESSURE SENSITIVE ADHESIVE COMPOSITION AND PRODUCTS

This is a continuation of application Ser. No. 08/183,056 filed Jan. 18, 1994, now abandoned.

FIELD OF THE INVENTION

The present invention relates to pressure sensitive adhesive compositions and pressure sensitive adhesive products, e.g., tapes and die-cut masking assemblies, that can be removed cleanly from a surface. More specifically, the present invention relates to pressure sensitive adhesive compositions that can be used in removable adhesive products such as masking tapes.

BACKGROUND OF THE INVENTION

Pressure sensitive adhesives, which are generally tacky at room temperature, have the capacity of promoting a strong holding force to a surface upon application of pressure, typically no more than finger pressure. Pressure sensitive adhesives are commonly used on products in the form of tapes or sheets. Such tapes are used in applications such as masking for painting operations, packaging, assembly operations, and the like.

In painting operations, pressure sensitive adhesive tapes are used to mask areas of a surface of automobiles, appliances, etc. adjacent to areas that are to be painted. Once painted, the masked article may be subjected to high temperatures, e.g., 120°–180° C., for a period of time, e.g., 30 minutes to 1 hour, to cure the paint. Once the article is painted and cured, the masking tape is removed. Thus, such masking tapes need to withstand high temperatures without deteriorating, staining, or leaving a deposit on the surface.

A pressure sensitive adhesive is typically characterized by its shear strength, peel strength, and tack, as well as its adhesive transfer, i.e., the amount of adhesive residue remaining after removal of the tape. Ideally, a pressure sensitive adhesive adheres tightly to a smooth nonfibrous surface upon application of light pressure, and yet can be removed without delaminating. Furthermore, desirable qualities of a pressure sensitive adhesive tape include solvent resistance and elevated temperature resistance. Ideally, a pressure sensitive adhesive tape should be removable without leaving an adhesive residue. However, this can be very difficult to accomplish especially if the tape has been exposed to high temperatures. Generally, a pressure sensitive adhesive composition includes an elastomeric polymer for adhesive strength and elasticity and a tackifying resin for tackiness and adhesion. A curing agent, i.e., crosslinking agent, for reaction with the elastomer may be used to render the adhesive more resistant to elevated temperatures, aging, and solvent. Other optional ingredients typically include catalyst(s), i.e., accelerator(s), for increasing the rate of reaction between the elastomer and curing agent, filler(s), antioxidant(s), and stabilizer(s).

Conventional pressure sensitive adhesive compositions often contain a heat curable crosslinking agent and at least 1 part by weight of a catalyst per 100 parts by weight of the elastomer, i.e., rubber, and usually about 5–10 parts per 100 parts of the elastomer. See, for example, British Patent Document 975,971 (published Nov. 25, 1964), U.S. Pat. No. 3,231,419 (issued Jan. 25, 1966), and U.S. Pat. No. 3,535,152 (issued Oct. 20, 1974). It is generally believed that adding a catalyst increases the rate of reaction between the elastomer and curing agent, and therefore increases the cohesive strength of the adhesive.

We have found that using a higher aliphatic mercaptan at a level of at least 0.1 percent by weight results in a pressure sensitive adhesive composition that produces a product that exhibits less adhesive transfer after baking than conventional compositions. Furthermore, in one aspect of the invention the composition does not require a curing step during production of a pressure sensitive adhesive product. This eliminates the additional time, energy, and specialized equipment needed to cure the adhesive during production.

SUMMARY OF THE INVENTION

The present invention provides a pressure sensitive adhesive composition that employs a higher aliphatic mercaptan at a level of at least 0.1 part by weight of the composition. Advantageously, the compositions of the present invention provide adhesives that have adhesive strength equal to or better than adhesives that do not employ the mercaptan, but with less adhesive transfer.

The compositions of the present invention include compatible mixtures of a crosslinkable elastomer, tackifying resin, the mercaptan, and optionally, phenolic resin curing agent, and catalyst, i.e., accelerator. As used herein, "compatible," means that each component of the composition is sufficiently dispersed in, preferably sufficiently soluble in, the other components such that each component remains in dispersion without substantial separation or precipitation, e.g., without bloom. The pressure sensitive adhesive compositions of the present invention include about 100 parts by weight of a crosslinkable elastomer, at least about 20 parts by weight of the tackifying resin, and at least 0.1 parts by weight of the higher aliphatic mercaptan. The mercaptan typically has at least 14 carbon atoms in the aliphatic group. The phenolic resin curing agent used, if any, is a heat curable phenolic resin. It typically comprises up to about 30 parts by weight of the composition. It preferably is a phenol-formaldehyde resin. The catalyst used, if any, typically comprises up to about 10 parts by weight of the composition. As used herein, "parts" or "phr" refer to parts by weight of a component per 100 parts by weight of the elastomer.

The present invention includes within its scope a pressure sensitive adhesive and tape. The adhesive tape typically has a backing with a pressure sensitive adhesive composition of the present invention coated on at least a portion of at least one surface, although the tape may also be provided in the form of an adhesive transfer tape. Also included within the scope of the invention are a substrate having an adhesive tape thereon, and a method of preparing a pressure sensitive adhesive product. The present invention also provides a method of masking a workpiece surface to facilitate painting a first area of the surface. This method includes applying an adhesive tape to a second area of the surface, wherein the adhesive tape includes a backing having a pressure sensitive adhesive composition of the present invention coated on at least one backing surface. Also provided is a die-cut masking assembly, which includes at least one sheet of a paint masking material of a predetermined design or configuration having at least a portion of at least one surface on which a pressure sensitive adhesive composition of the present invention is permanently adhered, and a release liner to which the pressure sensitive adhesive composition is releasably adhered; and a method of masking a workpiece surface to facilitate painting a first area of the surface using die-cut masking material of a predetermined design or configuration.

In the context of this invention, the term "aliphatic" means a saturated or unsaturated linear, branched, or cyclic hydrocarbon group. The term "alkyl" means a saturated linear, branched, or cyclic hydrocarbon group. The term "aryl" means a mono- or polynuclear aromatic hydrocarbon group. The term "polymeric" or "polymer" is used herein in its most general sense to mean a compound consisting essentially of repeating structural units.

DETAILED DESCRIPTION OF THE INVENTION

Figure 1:
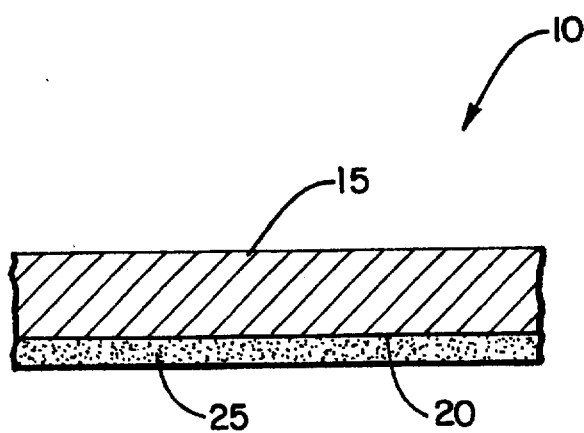
FIG. 1 is a cross-sectional view of an embodiment of a pressure sensitive adhesive product such as a tape.

The pressure sensitive adhesives of the present invention have sufficient tack to adhere to substrates using only light finger pressure. Additionally, they have sufficient adhesive strength to resist lifting from a substrate after being applied. Finally, preferred pressure sensitive adhesives of the present invention are removable with little or no adhesive transfer. That is, preferred pressure sensitive adhesives of the present invention leave little if any adhesive residue on the surface of a substrate upon removal. This is particularly advantageous in applications that require application of heat. Thus, the pressure sensitive adhesive compositions of the present invention provide products that result in only slight, if any, adhesive transfer and preferably no adhesive transfer, upon removal. As used herein, "slight" adhesive transfer means that no more than about 10% of a surface covered by the adhesive retains any visible residue of adhesive upon removal. As used herein, "heavy" adhesive transfer means that more than about 10% of the surface covered by the adhesive retains visible residue of the adhesive upon removal.

The pressure sensitive adhesive compositions of the present invention include a crosslinkable elastomer, a tackifying resin, a higher aliphatic, preferably higher alkyl, mercaptan, and optionally a heat curable phenolic resin, and a catalyst which catalyzes the reaction of the elastomer with the heat curable resin. The adhesives and tapes of the present invention can be used to advantage in high temperature applications.

Preferred compositions of the present invention are useful as "noncuring" compositions in pressure sensitive adhesive (PSA) products, e.g., tapes, that are useful up to 320° F. (160° C.) with little or no adhesive transfer. That is, a preferred product containing a "noncuring" pressure sensitive adhesive composition of the present invention requires no curing step during its manufacture to function, although a curing step could be used if desired. Conventional high temperature pressure sensitive adhesive products, i.e., those useful at temperatures above 250° F. (121° C.), need some type of curing step during production, either before or after the composition is applied to the backing, which adds to the complexity and cost of manufacture as well as the variability of the finished adhesive product.

In general, the amount of the elastomer that is used in the pressure sensitive adhesive compositions is effective to produce desirable cohesion and elastic qualities to the adhesive product of the present invention. Furthermore, the amount of the tackifying resin that is used is effective to provide desirable tack or adhesive qualities to the adhesive. Additionally, the amount of the mercaptan that is used is sufficient to provide no more than slight adhesive transfer. When the optional phenolic resin is used it is employed at a level that is effective to react with and crosslink the elastomer. Also, the amount of the catalyst that may be used is effective to increase the reaction rate between the elastomer and phenolic resin without causing undesirable aging.

The compositions of the present invention preferably contain about 100 parts by weight of elastomer, about 20–100 parts by weight tackifying resin, from about 0.1 to 10 parts by weight mercaptan, from about 3–30 parts by weight phenolic resin, and from about 0.01 to 10 parts by weight catalyst. These "parts" are based on the amount of elastomer. More preferably, the composition of the present invention contains about 100 parts of elastomer, about 25–80 parts tackifying resin, about 0.3 to 2 parts mercaptan, about 4–15 parts phenolic resin, and about 0.1 to 1 part catalyst.

Elastomer

The elastomer used in the pressure sensitive adhesive compositions of the present invention can be any crosslinkable elastomeric polymer. Aldehyde-reactive elastomeric polymers are especially useful. These polymers are crosslinkable as a result of their reactivity with aldehyde-containing resins. As used herein, an "elastomer" or "elastomeric polymer" is one that has properties similar to those of vulcanized natural rubber, i.e., the ability to be stretched to at least twice its original length and to retract very rapidly upon release to approximately its original length.

Suitable elastomers for use in the composition of the present invention include synthetic and naturally occurring crosslinkable aldehyde-reactive rubbers. Examples include, but are not limited to, natural rubber (cis-1,4-polyisoprene), butyl rubber, halogenated butyl rubbers, nitrile rubber, polybutadiene rubbers, synthetic polyisoprene rubbers, silicone rubbers, polychloroprene (i.e., neoprene), styrene-butadiene copolymers, styrene-isoprene copolymers, butadiene-acrylonitrile copolymers, and ethylene-propylene terpolymers (EPDMs).

More preferably, the elastomer used in the composition of the present invention is a "diene" elastomer, i.e., an elastomer containing C=C bonds polymerized from monomers having two double bonds, such as natural rubber, or polymers based on butadiene, isoprene, butadiene-styrene (SBR rubber), butadiene-acrylonitrile (NBR rubber), butyl rubber, and the like. The elastomer can also include block polymers based on diene elastomers. Most preferably, the elastomer is a diene elastomer having a high degree of unsaturation in the form of C=C as these elastomers react to a significant extent with the phenolic resin. As used herein, "high degree" of unsaturation means that over 50% of the polymer is from low molecular weight monomers, i.e., $C_4$–$C_8$ monomers, having conjugated double bonds. Examples of these elastomers include natural rubber and polybutadiene.

Tackifying Resin

Tack is the term used to quantify the sticky or adhesive characteristics of the adhesive. The tackifier, i.e., tackifying resin, contributes to the tack, shear strength, and peel strength of the adhesive. The tackifier used in the pressure sensitive adhesive composition of the present invention can be any tackifier, or mixture of tackifiers, typically used in pressure sensitive adhesives. It can be either a solid or a liquid tackifier. Suitable tackifiers are those that are amorphous, i.e., noncrystalline, materials that are compatible with the elastomer. Preferably, the tackifiers are soluble in the elastomers used in the composition of the present invention. These are well known in the art.

Suitable tackifiers include, but are not limited to, aliphatic hydrocarbon resins, aromatic hydrocarbon resins such as coumarone-indene resins, terpene resins, rosin acid derivatives such as a rosin ester, and the like. Aliphatic hydrocarbon resins are those that are formed from the polymerization of unsaturated aliphatic monomers. These include, but are not limited to, piperylene, isoprene, 2-methyl-2-butene, and dicyclopentadiene. Aromatic hydrocarbon resins include those obtained from carbon-based natural products, such as coumarone-indene resins, or those synthetically obtained, such as polymers formed from monomers such as indene, methylindene, styrene, methylstyrene, dicyclopentadiene, or combinations thereof. Terpene resins, i.e., polyterpene resins, are typically obtained from the polymerization of turpentine or components thereof, e.g., α- or β-pinene, in the presence of catalysts such as aluminum chloride or mineral acids. The typical rosin acids are abietic acid and pimaric acid obtained from pine tree sap. These acids are generally not used directly as tackifiers, however, they can be modified in various ways to form useful tackifying resins. For example, they can be reacted with alcohols to provide a rosin ester. They can also be hydrogenated, disproportionated, or polymerized to form useful tackifying materials.

Preferably, the tackifier is an aliphatic resin, in the form of either a solid, liquid, or mixture thereof. More preferably, the tackifier is an aliphatic solid resin. Suitable such tackifying resins include ESCOREZ™ 1310, 1304, and 1102 available from Exxon Chemical Company (Houston, Tex.), WINGTACK™ 95 and 115 available from The Goodyear Tire and Rubber Company (Akron, Ohio), and PICCOTAC™ B and 115 available from Hercules Inc. (Wilmington, Del.). Numerous other manufacturers produce similar tackifying resins. Most preferably, the tackifying resin is a solid aliphatic resin having a number average molecular weight of about 900–1300 with a softening point of about 80°–120° C. as determined by ring and ball measurement.

The choice of tackifying resin or resins depends on the elastomer or mixture of elastomers in the composition. For example, natural rubber and butyl rubber are typically tackified by tackifying resins composed of wood rosins or rosin esters, terpene resins, or any of the aliphatic or aromatic resins listed above.

Mercaptan

The higher aliphatic mercaptan used in the present invention can be represented by the general formula R—SH wherein R is an aliphatic radical of at least 14 carbon atoms. The aliphatic radical may contain hereto atoms, such as oxygen, if desired, provided that they do not materially interfere with the functioning of the mercaptan. Typically R contains no more than 30 carbon atoms, although this is for economies of manufacture rather than for any other reason. Preferably R contains from 16 to 20 carbon atoms and is an alkyl group. Examples of useful mercaptans include hexadecyl mercaptan, octadecyl mercaptan, octadecyl-3-mercaptopropionate and the like.

Phenolic Resin

Phenolic resins are any of several types of synthetic resins obtained by the condensation of phenol or substituted phenols with aldehydes such as formaldehyde, acetaldehyde, and furfural. Phenol-formaldehyde resins constitute the broadest class of phenolic resins. The pressure sensitive adhesive compositions of the present invention incorporate any of a variety of phenolic resins that are: oil soluble, i.e., sufficiently soluble in the elastomer so as not to bloom; reactive with the elastomer; and heat curable, i.e., capable of being converted to cured, crosslinked structures upon heating at temperatures above about 30° C. In this way, the phenolic resins act as curing agents to enhance the conversion of the elastomer into a crosslinked tacky state. Preferably, the pressure sensitive adhesive compositions of the present invention incorporate a phenol-formaldehyde resin.

Phenol-formaldehyde resins are generally classified as either novolak or resole resins. A novolak resin is a thermoplastic resin prepared by the reaction of formaldehyde with an excess of phenol in the presence of an acid catalyst. Typically, these are solid resins. A resole resin is a thermosetting resin prepared by the reaction of phenol with an excess of formaldehyde in the presence of a basic catalyst. Although either novolak or resole resins can be used in the compositions of the present invention as long as they meet the requirements listed above, resole resins are generally preferred at least because they are more readily reactive with elastomers.

A particularly preferred phenol-formaldehyde resole resin is prepared from the reaction of a bifunctional phenol, i.e., an ortho- or para-substituted phenol, with formaldehyde under alkaline conditions. Preferably, this is carried out in the presence of water. After the proper reaction time, the solution is typically neutralized to precipitate the resin. The phenol can be alkyl or aryl substituted, preferably it is alkyl substituted. The preferred phenols are the higher para-alkyl phenols, i.e., those having $C_4$–$C_9$ alkyl substituents, such as para-butyl, octyl, or nonyl phenol. More preferably, the alkyl group is branched. An example of such a phenolic resin is available from Schenectady International Inc. (Schenectady, N.Y.) under the trade designation Schenectady HRJ 10518 phenolic resin.

Catalyst

The adhesive compositions of the present invention preferably include a catalyst, i.e., accelerator, to increase the rate of reaction between the elastomer and phenolic resin in the composition to form an adhesive with sufficient cohesive strength. Suitable catalysts are those that are compatible with the components of the adhesive composition. That is, catalysts that can be used in the compositions of the present invention are not active toward, or reactive with, the ingredients of the composition other than the elastomer and phenolic resin. Suitable catalysts include acids, whether organic or inorganic, including acidic metal salts.

It has been discovered that a wide range of catalyst concentration can be employed in the practice of the invention. Thus, for example, as little as 0.01 part by weight of the catalyst can be employed. When low levels of catalyst are employed, that is levels less than about 1 part by weight, the adhesive and tape made therefrom have improved shelf stability. Moreover, tape made with such an adhesive may be cured either before or after application to a substrate.

Suitable acid catalysts include, but are not limited to: strong inorganic acids such as hydrochloric acid, sulfuric acid, phosphoric acid, and the like; para-toluene sulfonic acid, oxalic acid; and alpha-sulfonated fatty acids having the general formula:

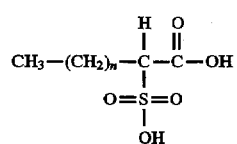

wherein n=0–20. Examples of such alpha-sulfonated fatty acids include, but are not limited to, alpha-sulfopalmitic acid and alpha-sulfostearic acid. Other useful acidic catalysts are known, such as those disclosed in British Patent Document 975,971 (published Nov. 25, 1964), and U.S. Pat. No.

3,231,419 (issued Jan. 25, 1966). Examples of such catalysts include, but are not limited to: the mono- or di-esters of an aliphatic or aromatic alcohol and phosphoric anhydride such as phenyl acid phosphate, butyl diacid phosphate, and dibutyl acid phosphate; and acid-modified, oil-soluble, heat-reactive phenol-formaldehyde resins such as the reaction product of an alkylphenol-formaldehyde resin and sulfuric acid or phosphoric acid.

Although certain of these acid catalysts, such as the alpha-sulfonated fatty acids, may not be sufficiently compatible with the compositions of the present invention, their compatibility can be improved by use of suitable solvents as described in U.S. Pat. No. 3,231,419 (issued Jan. 25, 1966). Examples of such solvents include, but are not limited to: phenols such as phenol, cresol, and dodecylphenol; aliphatic alcohols such as methanol, ethanol, t-butyl alcohol, benzyl alcohol, and n-octyl alcohol; glycols such as ethylene glycol and propylene glycol; aliphatic ketones such as methyl ethyl ketone and cyclohexanone; esters such as methyl phthalyl ethyl glycollate.

Compounds that generate useful acids on contact with water can also be used as catalysts in the compositions of the present invention. These include, for example, boron trifluoride etherate, acetyl chloride, para-toluene sulfonyl chloride, and thionyl chloride. A preferred acid catalyst is para-toluenesulfonic acid.

Suitable acidic metal salt catalysts include acidic metal carboxylates, alkoxides, and halides. These include, but are not limited to, zinc acetate, zinc octoate, stannous octoate, nickel octoate, zirconium octoate, titanium isopropoxide, nickel chloride, zirconium chloride, aluminum chloride, titanium chloride, zinc chloride, stannous chloride, etc. A preferred acidic metal salt catalyst is selected from a group consisting of the metal octoate and halide salts. Although any acidic metal salt can be used, the preferred metal salts are zinc and tin salts. Most preferably, the acidic metal salt catalyst is selected from a group consisting of zinc octoate and stannous chloride.

Additives

The pressure sensitive adhesive compositions of the present invention can also include other optional components, herein referred to as additives. Suitable additives are compatible with the other components of the composition. That is, additives that can be used in the compositions of the present invention do not interfere with the reactivity or activity of the other components in a manner that detrimentally effects the desired characteristics of the adhesive. These additives include, for example, antioxidants, fillers, colorants, uv absorbers, heat stabilizers, plasticizers, etc. Each additive is used in an amount effective to produce a desired effect without detrimentally affecting the desired characteristics of the adhesive.

Antioxidants can be used in the adhesive compositions of the present invention to reduce the degradation of the elastomers upon exposure to high temperatures. Suitable antioxidants include, but are not limited to, hindered phenolics, thioesters, phosphites, and hindered amines. Preferably, the antioxidants used in the compositions of the present invention are hindered phenolics and thioesters. Specific examples of suitable antioxidants include thioesters sold under the trade names CYANOX™ LTDP and STDP by American Cyanamid Company (Wayne, N.J.), and hindered phenols sold under the trade names IRGANOX™ 1010 and 1076 by Ciba-Geigy Corporation (Hawthorne, N.Y.). More preferably, the antioxidants are thioesters. In general, if an antioxidant is used, what is required is that enough antioxidant be used to achieve the desired result. If desired, typically up to about 5 wt-%, preferably about 0.2–3 wt-%, and more preferably about 0.5–2 wt-%, can be used in the adhesive compositions of the present invention. As used herein, "wt-%" refers to an amount of a component relative to the total weight of the composition, excluding solvent.

Fillers can also be used in the adhesive compositions of the present invention to provide reinforcement to the adhesive and to lower the cost. Suitable fillers include, but are not limited to, silicas, clays, aluminum hydrate, carbon black, titanium dioxide, and calcium carbonate. In general, if a filler is used, what is required is that sufficient filler be used to achieve the desired effect. If desired, typically up to about 25 wt-%, preferably about 1–15 wt-%, and more preferably about 5–10 wt-%, can be used in the adhesive compositions of the present invention.

The color of the adhesive compositions of the present invention can be modified by colorants such as inorganic pigments, organic pigments, and dyes. Pigments are also useful for providing protection against degradation from ultraviolet radiation by reducing the penetration of UV radiation into the adhesive. Suitable colorants include, but are not limited to, carbon black and titanium dioxide. In general, if a colorant is used, what is required is that enough colorant be used to achieve the desired result. If desired, typically up to about 5 wt-%, preferably about 0.01–3 wt-%, and more preferably about 0.05–1 wt-% can be used in the adhesive compositions of the present invention.

UV absorbers can also be used in the compositions of the present invention to provide protection against ultraviolet degradation of the adhesive. Suitable UV absorbers include, but are not limited to, benzophenone, hindered amine light stabilizers, and derivatives of benzotriazole. In general, if a UV absorber is used, what is required is that a sufficient amount of UV absorber be used to achieve the desired result. If desired, typically up to about 1 wt-%, and preferably about 0.02–0.5 wt-% can be used in the adhesive compositions of the present invention.

Backing

A variety of backing materials are suitable for use in pressure sensitive adhesive products, e.g., tapes. The backing is generally thin and flexible such that the adhesive coated tape can be wound upon itself in roll form and can conform to surfaces to which the tape is applied. Preferably, the backing is about 0.001–0.01 inch (0.003–0.025 cm) thick, and more preferably about 0.001–0.005 inch (0.003–0.013 cm) thick so that a very thin paint line is produced in masking applications. It can be non fibrous, fibrous, or a combination thereof. For example, polymeric films, fabrics, glass, asbestos, paper, and metallic films can be used. Fabrics can be made of synthetic material or natural fibers. Examples of fabrics include, but are not limited to: polyamides such as nylon; polyesters such as dacron; cotton; linen; and rayon. Paper is generally made of a high proportion of softwood fibers for optimum strength and mechanical characteristics. Examples of suitable papers for this purpose are glassine, parchment, supercalendered kraft, clay-coated kraft, machine glazed, and soft-nip and machine-calendared kraft. Examples of suitable metallic films include, but are not limited to, aluminum, copper, lead, iron, and zinc foils. Typically, the backing material is chosen such that it is generally resistant to organic solvents and high temperatures, e.g., not deleteriously affected by solvents and temperatures used in painting operations.

Other suitable backing materials include, but are not limited to: ethyl cellulose; regenerated cellulose; cellulose acetate; cellulose acetate-butyrate; cellulose propionate; acrylonitrile polymers; plasticized and unplasticized vinyl chloride polymers such as, polyvinyl chloride, polyvinylidene chloride-vinyl chloride polymers and vinyl chloride-vinyl acetate polymers; polyethylene; polypropylene; polyhaloethylenes such as chlorinated polyethylene, polytetrafluorethylene, and polytrifluoromonochloroethylene; polyvinyl alcohol; polymers of styrene such as styrene and acrylonitrile; polyvinyl acetals such as polyvinyl butyral; and polyesters such as MYLAR™ or metallized MYLAR™. Preferred backing materials include plasticized vinyl and paper. Plasticized poly(vinyl chloride) provides a good balance of flexibility and strength. An example of a commercially available plasticized poly(vinyl chloride) is Type SK-P vinyl film available from B.F. Goodrich Chemicals as Geon™ 460X46. Paper tears easily and withstands higher temperatures than many plastics.

Preparation of Adhesive Composition and Tape

The pressure sensitive adhesive compositions of the present invention are typically prepared by combining the individual components in a compatible organic solvent, i.e., an organic solvent in which the components can be uniformly dispersed, preferably dissolved, such as heptane, toluene, xylene, and the like. The composition is then mixed in a slow speed, high torque mixer until the components are uniformly dispersed, preferably dissolved. The resultant dispersion, preferably solution, can be applied to at least one surface of the backing by any one of several conventional techniques. These include, for example, direct and reverse roll, rubber roll and knife, or knife and rubber blanket. The amount of solvent used can vary depending upon the desired composition viscosity, coating thickness, coating apparatus, and backing material. In general, a composition of about 70–85% solvent by weight has a satisfactory viscosity for use with most coating machines and upon most backings. The adhesive composition is generally coated in an amount of about 15–75 g/m² of the surface of the backing.

The coated backing material is then subjected to a drying step to remove the solvent. Typically, this involves exposing the coated backing material to a temperature less than about 300° F. (149° C.), preferably about 150°–200° F. (65°–93° C.). When exposed to such temperatures, the solvent is typically removed by evaporation in less than about 5 minutes, preferably about 1–3 minutes. Generally, the higher the temperature used for drying, the shorter the exposure time required. Although there may be a small amount of curing that occurs between the elastomer and phenolic resin during the drying step, it is desirable that the temperature and time are selected such that the solvent is driven off with substantially no curing. Subsequent to this, the coated backing material is ready for use. Thus, no curing step is required during manufacture of the composition or product, nor is it desired. That is, the coated backing material does not need to be exposed to higher temperatures to effectuate cure during production.

As a result, the adhesive composition of the present invention which employs the phenolic resin curing agent can be applied to a backing material and stored or used immediately without further processing. The resultant product can be used effectively in applications requiring any of a variety of temperatures, including room temperature. If the adhesive composition is used in an application that requires the use of high temperatures, the adhesive cures upon exposure to the elevated temperature. Advantageously, the cured adhesive leaves little or no adhesive residue upon removal from the surface to which it was applied, which provides significant advantage.

When no phenolic resin curing agent is used in the adhesive, the same advantages have been observed. That is, the adhesive can be applied to a backing material and stored or used immediately. It can be used effectively in applications requiring any of a variety of temperatures. However, it has been found that the amount of the mercaptan employed may have to be increased in order to achieve little or no adhesive transfer. For example, best results with a "no phenolic curative" formulation have been achieved when the level of the mercaptan is in the range of from 0.7 to 10 parts by weight mercaptan.

Figure 2:
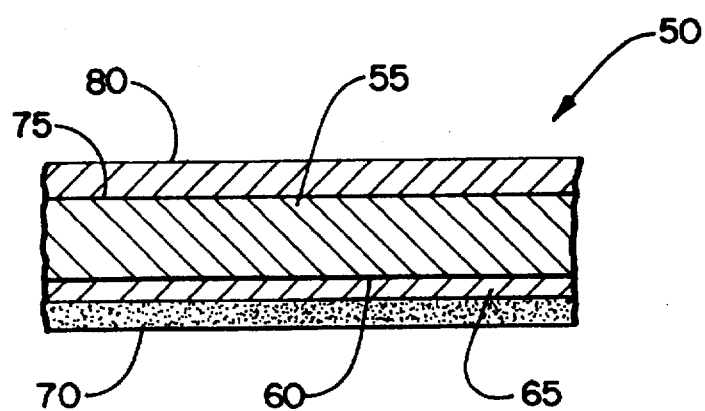
FIG. 2 is a cross-sectional view of an alternative embodiment of a pressure sensitive adhesive product.

FIGS. 1 and 2 show cross-sections of two embodiments of a masking tape of the present invention. It is to be understood that the embodiments are shown as examples for illustrative purposes only and not for limiting the scope of the invention. Other embodiments with variations in details are possible. Referring to FIG. 1, a masking tape 10 includes a backing material 15 having a surface 20 on which a pressure sensitive adhesive layer 25 is disposed. Referring to FIG. 2, a masking tape 50 includes a backing material 55 having a surface 60 on which a primer layer 65 is disposed. A pressure sensitive adhesive layer 70 is disposed on this primer layer 65. On a second surface 75, i.e., the side of the backing material opposite from that on which the primer and adhesive are coated, is disposed a release coating 80. A backsize coating, located between the backing 55 and release coating 80 may also be used.

Thus, if desired, a primer layer can be interposed between the backing material and the pressure sensitive adhesive to more firmly secure the adhesive to the backing. Any of a variety of primer layers, i.e., primer coatings, used in the manufacture of pressure sensitive adhesive tapes can be used. Examples include, but are not limited to, elastomers or mixtures thereof as discussed above. Examples of useful primers include conjugated diene polymers, acrylic copolymers, butadiene-acrylonitrile copolymers, ethylene-acrylic acid copolymers, ethylene-vinyl acetate copolymers, carboxylated vinyl chloride latex, and ethylene-vinyl chloride latex. Examples of such primers may be found in, for example, U.S. Pat. No. 3,232,785, U.S. Pat. No. 3,129,816, U.S. Pat. No. 2,889,038, U.S. Pat. No. 2,785,087, U.S. Pat. No. 3,092,250, and WO 93/07228. Examples of commercially available primers include Geon 460X46, a vinyl chloride latex commercially available from B.F. Goodrich, and Airflex 4514, an ethylene-vinyl chloride latex available from Air Products. If desired, combinations of two or more primers can be employed. The specific choice of primer generally depends on the backing material; however, it can also depend on the specific formulation of the pressure sensitive adhesive.

For ease in unrolling the tape, it is often desirable to use a release coating, i.e., a layer of a material that decreases the adhesion of the adhesive to opposite side of the backing. This release coating, 80 in FIG. 2, is applied on the surface of the backing opposite that on which the pressure sensitive adhesive is applied. This surface to which the release coating is applied is often referred to as the face surface of the tape. In this way, the tape can be stored in a roll without any protective covering on the adhesive.

Applications

Although the pressure sensitive adhesive compositions of the present invention can be used in various applications, they are particularly useful in masking tapes for painting applications. In many industries, such as the automobile and appliance industries, it is desirable to spray paint finished products so that they will be in one color or tone on one side of some predetermined demarcation zone, e.g., line, and of another color or tone on the other side of the demarcation zone. Such demarcation must be substantially precise along the demarcation zone so as to maintain consistency of finish. Typically, the masking tape is affixed to a surface of a workpiece with one tape side edge disposed coextensive with the demarcation zone. This separates that portion of the workpiece surface that is to be painted from that portion that is not to be painted. The tape can be used alone or to retain paper, cloth, or a plastic film adjacent to the demarcation zone and in a position to cover a portion of a workpiece that is to be protected during application of the paint.

The pressure sensitive adhesive compositions of the present invention can also be used in die-cut paint masking assemblies. Typically, a die-cut paint masking assembly includes a laminated structure having at least one sheet of paint masking material of a predetermined design or configuration having at least one surface coated with a pressure sensitive adhesive. The pressure sensitive adhesive is permanently adhered to the masking material. This assembly of masking material and adhesive is releasably adhered to a release liner, such that the release liner is applied to the adhesive side of the masking material. In this way, the release liner acts to protect the adhesive and retain the assembly construction during fabrication. Such die-cut paint masking assemblies are typically used in paint processes in which the demarcation zone is not a straight line, but is curved, continuous, closed, or otherwise unusually configured.

The masking material can be constructed from any type of material used in masking tape backings as described above. The release liner can also be constructed of any type of liner material used in die-cut masking assemblies. An example of such a material is a coated heavy paper that can be selectively removed from the adhesive-coated masking material to expose the adhesive. The paint masking assembly can be only a single sheet of paint masking material on a sheet of liner material, or can be a plurality of sheets of paint masking material adhered along an elongate sheet of liner material that can, for example, be wound in a coil around a hub of a reel from which the sheets of paint masking material are sequentially removed.

Figure 3:
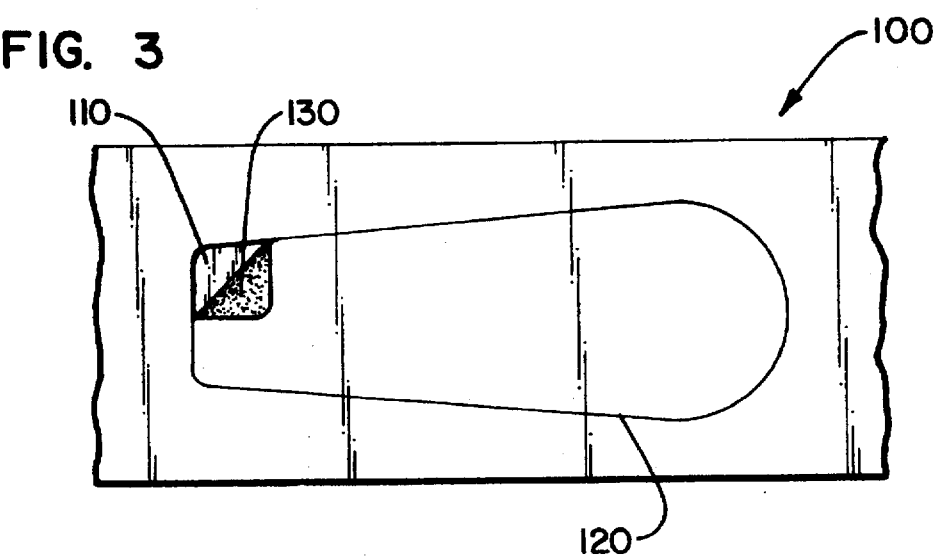
FIG. 3 is a schematic of a die-cut masking assembly.

Referring to FIG. 3, an exemplary embodiment of a die-cut paint masking assembly 100 is shown. Generally, the assembly 100 includes a release liner 110, a continuous sheet of a paint masking material 120 having a periphery of a predetermined shape, and a layer 130 of a pressure sensitive adhesive permanently adhered on one side of the paint masking material 120. The layer 130 of pressure sensitive adhesive is releasably adhered to the release liner 110.

The pressure sensitive adhesive compositions of the present invention can be used in any die-cut masking assembly. Examples of such assemblies are disclosed in U.S. Pat. No. 4,420,520 (issued Dec. 13, 1983); U.S. Pat. No. 4,796,330 (issued Jan. 10, 1989); and U.S. Pat. No. 4,397,261 (issued Aug. 9, 1983).

The following examples are offered to further illustrate the various specific and preferred embodiments and techniques. It should be understood; however, that many variations and modifications may be made while remaining within the scope of the present invention.

EXPERIMENTAL EXAMPLES

Adhesive Transfer Test

Examples of this invention are shown in Table 1. Samples of tape prepared from the compositions of the present invention were tested for adhesive residue remaining after removal of the tape. Each of the samples was prepared by dissolving the components in heptane and coating the solution onto a backing material approximately 0.004 inches (0.01 cm) thick. The backing material was initially coated with a primer composition. The primer composition was coated onto the vinyl backing and dried to provide a nominal coating weight of 1.9 g/m$^2$ prior to application of the adhesive composition. The solvent from the adhesive composition was removed by drying the adhesive-coated tape for five minutes at room temperature and then at 150° F. (66° C.) in an air circulating oven. No curing was done before the samples were tested. The resulting tape was cut into 0.5×7 inch (1.27×17.78 cm) pieces and applied to a steel panel that had been painted with "50J" acrylic enamel paint used by Ford Motor Company, as described in U.S. Pat. No. 5,116,676 (issued May 26, 1992). Pressure was then applied to the tape samples with three double passes of a 4.5 pound (2.041 kg) rubber roller. The panel was then placed in an air circulating oven at 300° F. (149° C.) for 45 minutes. The panel was then allowed to cool to room temperature (i.e., 22° C.). The tape was removed and the amount of adhesive residue was evaluated as being none, slight, or heavy, with "slight" being less than about 10% of the surface covered with visible residue of the adhesive and "heavy" being about 10% or more of the surface covered with visible residue of the adhesive, after the tape is removed.

In the examples, the following backing and primer materials were used:

Backing Materials
    A=plasticized poly(vinyl chloride)
    B=polyester film (i.e., poly(ethylene terephthalate)
    C=nylon 6,6 (Dartek™ from E.I. du Pont de Nemours)
    D=styrene-butadiene rubber saturated crepe paper (Kimberly Clark Corporation)

Primer Materials
    I=carboxylated vinyl chloride latex (Geon™ 460X46, B.F. Goodrich)
    II=ethylene-vinyl chloride latex (Airflex™ 4514, Air Products)
    III=mixture of acrylonitrile-butadiene polymer and natural rubber Results Generally, the examples with no higher alkyl mercaptan or a mercaptan having less than 14 carbon atoms in the alkyl group gave heavier adhesive transfer (indicating poorer cohesive strength) than the examples of the invention.

TABLE 1

| Example No: | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Natural Rubber, SMR CV 60[1] | 100 | 100 | 100 | 100 | 100 | 100 | 100 | 100 | 100 | 100 | 100 | 100 | 100 | 100 |
| Piccotac 115[2], tackifier | 42 | 45 | 42 | 42 | 42 | 42 | 42 | 42 | 42 | 45 | 42 | 45 | 45 | 45 |
| Pentalyn K[3], tackifier | 1.2 | 1.5 | 1.2 | 1.2 | 1.2 | 1.2 | 1.2 | 1.2 | 1.2 | 1.5 | 1.2 | 1.5 | 1.5 | 1.5 |

TABLE 1-continued

| | | | | | | | | | | | | | | |
|---|---|---|---|---|---|---|---|---|---|---|---|---|---|---|
| Wingstay L(4), antioxidant | — | 1.0 | — | — | — | — | — | — | — | 1.0 | — | 1.0 | 1.0 | 1.0 |
| Mark 2140(5), antioxidant | 2.1 | 1.5 | 2.1 | 2.1 | 2.1 | 2.1 | 2.1 | 2.1 | 2.1 | 1.5 | 2.1 | 1.5 | 1.5 | 1.5 |
| HRJ 10518(6), phenolic | 6.1 | — | 6.1 | 6.1 | 6.1 | 6.1 | 6.1 | 6.1 | 6.1 | — | 6.1 | 6.2 | 6.2 | 6.2 |
| Stannous Chloride, catalyst | 0.14 | 0.2 | 0.14 | 0.14 | 0.14 | 0.14 | 0.14 | 0.14 | 0.14 | 0.2 | 0.14 | 0.2 | 0.2 | 0.2 |
| Higher Alkyl Materials | | | | | | | | | | | | | | |
| Octadecane | — | — | 0.7 | — | — | — | — | — | — | — | — | — | — | — |
| Octadecanol | — | — | — | 0.7 | — | — | — | — | — | — | — | — | — | — |
| Octadecyl Mercaptan | — | — | — | — | 0.05 | 0.2 | — | 0.35 | — | 0.5 | 0.6 | 0.6 | 0.6 | 0.6 |
| Dodecyl Mercaptan | — | — | — | — | — | — | — | — | 0.35 | — | — | — | — | — |
| Hexadecyl Mercaptan | — | — | — | — | — | — | 0.25 | — | — | — | — | — | — | — |
| Backing | A | A | A | A | A | A | A | A | A | A | A | A | B | C |
| Primer | III | III | III | III | III | III | III | III | III | III | III | III | I | I | I |
| Adhesive Transfer | heavy | heavy | heavy | heavy | heavy | slight | none | none | heavy | heavy | none | none | none | none |

| Example No: | 15 | 16 | 17 | 18 | 19 | 20 | 21 | 22 | 23 | 24 | 25 | 26 | 27 |
|---|---|---|---|---|---|---|---|---|---|---|---|---|---|
| Natural Rubber, SMR CV 60(1) | 100 | 100 | 100 | 100 | 100 | 100 | 100 | 100 | 100 | 100 | 100 | 100 | 100 |
| Piccotac 115(2), tackifier | 45 | 45 | 45 | 45 | 45 | 45 | 42 | 45 | 42 | 45 | 42 | 45 | 42 |
| Pentalyn K(3), tackifier | 1.5 | 1.5 | 1.5 | 1.5 | 1.5 | 1.5 | 1.2 | 1.5 | 1.2 | 1.5 | 1.2 | 1.5 | 1.2 |
| Wingstay L(4), antioxidant | 1.0 | 1.0 | 1.0 | 1.0 | 1.0 | 1.0 | — | 1.0 | — | 1.0 | — | 1.0 | — |
| Mark 2140(5), antioxidant | 1.5 | 1.5 | 1.5 | 1.5 | 1.5 | 1.5 | 2.1 | 1.5 | 2.1 | 1.5 | 2.1 | 1.5 | 2.1 |
| HRJ 10518(6), phenolic | 6.2 | 6.2 | 6.2 | 6.2 | 6.2 | 6.2 | 6.1 | — | 6.1 | — | 6.1 | — | 6.1 |
| Stannous Chloride, catalyst | 0.2 | 0.2 | 0.2 | 0.2 | 0.2 | 0.2 | 0.14 | 0.2 | 0.14 | 0.2 | 0.14 | 0.2 | 0.14 |
| Higher Alkyl Materials | | | | | | | | | | | | | |
| Octadecane | — | — | — | — | — | — | — | — | — | — | — | — | — |
| Octadecanol | — | — | — | — | — | — | — | — | — | — | — | — | — |
| Octadecyl Mercaptan | 0.6 | 0.6 | 0.6 | 0.6 | 0.6 | 0.6 | — | 1.0 | 1.1 | 2.0 | 3.5 | 5.0 | 8.9 |
| Dodecyl Mercaptan | — | — | — | — | — | — | — | — | — | — | — | — | — |
| Hexadecyl Mercaptan | — | — | — | — | — | — | 0.7 | — | — | — | — | — | — |
| Backing | D | A | B | C | D | A | A | A | A | A | A | A | A |
| Primer | I | II | II | II | II | I | III | III | III | III | III | III | III |
| Adhesive Transfer | none | none | none | none | none | none | none | none | none | none | none | none | none |

(1)Available from Oreand Chemical Company
(2)Available from Hercules Chemical Company
(3)Available from Hercules Chemical Company
(4)Available from Goodyear Chemical
(5)Available from Witco Chemical Company
(6)Available from Schenectady The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A pressure sensitive adhesive composition comprising:
   (a) about 100 parts by weight of a crosslinkable polymerized elastomer;
   (b) at least about 20 parts by weight of a tackifying resin;
   (c) at least about 0.1 part by weight of a higher alkyl mercaptan;
   (d) optionally up to about 30 parts by weight of a heat curable phenolic resin; and
   (e) optionally up to about 10 parts by weight of a catalyst for said phenolic resin,
wherein after a tape comprising a film of said pressure sensitive adhesive composition is adhered to a substrate and removed, there is little or no adhesive transfer to the substrate.

2. The pressure sensitive adhesive composition of claim 1 comprising about 0.1–10 parts by weight of the higher aliphatic mercaptan.

3. The pressure sensitive adhesive composition of claim 2 comprising about 3–30 parts by weight of the phenolic resin.

4. The pressure sensitive adhesive composition of claim 3 comprising about 0.1–1 part by weight of the catalyst.

5. The pressure sensitive adhesive composition of claim 3 wherein the phenolic resin is a phenol-formaldehyde resin.

6. The pressure sensitive adhesive composition of claim 4 wherein the catalyst is an acidic metal salt catalyst.

7. The pressure sensitive adhesive composition of claim 2 comprising about 0.3 to 2 parts by weight of the mercaptan.

8. The pressure sensitive adhesive composition of claim 1 wherein the mercaptan contains at least 14 carbon atoms in the alkyl group.

9. The pressure sensitive adhesive composition of claim 8 wherein the crosslinkable elastomer is an aldehyde-reactive elastomer.

10. The pressure sensitive adhesive composition of claim 1 wherein the mercaptan is a higher alkyl mercaptan.

11. A pressure sensitive adhesive tape comprising a film of a pressure sensitive adhesive composition which comprises:

(a) about 100 parts by weight of a crosslinkable polymerized elastomer;

(b) at least about 20 parts by weight of a tackifying resin;

(c) at least about 0.1 part by weight of a higher alkyl mercaptan;

(d) optionally up to about 30 parts by weight of a heat curable phenolic resin; and (e) optionally up to about 10 parts by weight of a catalyst for said phenolic resin, wherein after said tape is adhered to a substrate and removed, there is little or no adhesive transfer to the substrate.

12. The pressure sensitive adhesive tape of claim 11 wherein the adhesive film is coated on at least a portion of at least one surface of a flexible backing.

13. The adhesive tape of claim 11 wherein the mercaptan is a higher alkyl mercaptan.

14. The adhesive tape of claim 13 wherein the adhesive composition comprises about 0.1–10 parts by weight of the higher alkyl mercaptan.

15. The adhesive tape of claim 13 wherein the adhesive composition comprises about 3–30 parts by weight of the phenolic resin.

16. The adhesive tape of claim 13 wherein the adhesive composition comprises about 0.1–1 part by weight of the catalyst.

17. The adhesive tape of claim 13 wherein the adhesive composition has been cured.

18. The adhesive tape of claim 13 wherein the crosslinkable elastomer is an aldehyde-reactive elastomer.

19. A substrate having an adhesive tape thereon, wherein the adhesive tape comprises a film of a pressure sensitive adhesive composition wherein the pressure sensitive adhesive comprises:

(a) about 100 parts by weight of a crosslinkable polymerized aldehyde-reactive elastomer;

(b) at least about 20 parts by weight of a tackifying resin;

(c) at least about 0.1 part by weight of a higher alkyl mercaptan;

(d) optionally up to about 30 parts by weight of a heat curable phenolic resin; and (e) optionally up to about 10 parts by weight of a catalyst for said phenolic resin, wherein after said adhesive tape is removed from said substrate, there is little or no adhesive transfer to the substrate.

20. The substrate of claim 19 wherein the adhesive composition has been cured.

21. A die-cut masking assembly comprising:

(a) at least one sheet of a paint masking material of a predetermined design or configuration having at least a portion of at least one surface on which a pressure sensitive adhesive composition is adhered; wherein the pressure sensitive adhesive composition comprises:

(a) about 100 parts by weight of a crosslinkable polymerized elastomer;

(b) at least about 20 parts by weight of a tackifying resin;

(c) at least about 0.1 part by weight of a higher alkyl mercaptan;

(d) optionally up to about 30 parts by weight of a heat curable phenolic resin; and (e) optionally up to about 10 parts by weight of a catalyst for said phenolic resin, wherein after said sheet of paint masking material is adhered to a substrate and removed, there is little or no adhesive transfer to the substrate, (b) a release liner to which the pressure sensitive adhesive composition is releasably adhered.

22. The pressure sensitive adhesive composition of claim 1 wherein after a tape comprising a film of said pressure sensitive adhesive composition is adhered to a substrate and removed, no more than about 10% of the substrate that was covered by the adhesive retains visible residue.

23. The pressure sensitive adhesive tape of claim 11 wherein after said tape is adhered to a substrate and removed, no more than about 10% of the substrate that was covered by the adhesive retains visible residue.

24. The substrate having an adhesive tape thereon of claim 19, wherein after said tape is removed from said substrate, no more than about 10% of the substrate that was covered by the adhesive retains visible residue.

25. The substrate having an adhesive tape thereon of claim 24 wherein said substrate is painted steel.

26. The substrate having an adhesive tape thereon of claim 25 wherein the substrate and the tape thereon are heated prior to the tape being removed.

27. The pressure sensitive adhesive masking assembly of claim 21 wherein after said sheet of paint masking material is adhered to a substrate and removed, no more than about 10% of the substrate that was covered by the adhesive retains visible residue.

\* \* \* \* \*